(12) United States Patent
Dykstra (10) Patent No.: US 12,123,691 B2
(45) Date of Patent: Oct. 22, 2024

(54) PRECISION DEPTH MEASUREMENT DEVICE

(71) Applicant: Greg Dykstra, Meadow, SD (US)

(72) Inventor: Greg Dykstra, Meadow, SD (US)

( * ) Notice: Subject to any disclaimer, the term of this patent is extended or adjusted under 35 U.S.C. 154(b) by 437 days.

(21) Appl. No.: 17/527,702

(22) Filed: Nov. 16, 2021

(65) Prior Publication Data

US 2023/0152072 A1    May 18, 2023

(51) Int. Cl.
*G01B 5/18* (2006.01)
*F42B 33/04* (2006.01)
*F42B 35/02* (2006.01)

(52) U.S. Cl.
CPC .............. *F42B 33/04* (2013.01); *F42B 35/02* (2013.01); *G01B 5/18* (2013.01)

(58) Field of Classification Search
CPC . F42B 33/04; F42B 35/02; G01B 5/18; G01B 3/28
See application file for complete search history.

(56) References Cited

U.S. PATENT DOCUMENTS

| | | | | |
|---|---|---|---|---|
| 3,197,877 A | * | 8/1965 | Aldeborgh | G01B 3/28 33/542 |
| 3,318,007 A | * | 5/1967 | Goetz | G01B 3/22 33/613 |
| 3,580,127 A | | 5/1971 | Lee | |
| 4,248,132 A | * | 2/1981 | Blomseth | F42B 35/02 86/24 |
| 4,425,833 A | | 1/1984 | Purdie | |
| 4,918,825 A | * | 4/1990 | Lesh | F42B 35/02 42/1.07 |
| 5,025,706 A | * | 6/1991 | Markle | F42B 33/04 86/36 |
| 5,170,569 A | * | 12/1992 | Anderson | G01B 5/0023 33/794 |
| 5,309,813 A | | 5/1994 | Henley | |
| 5,341,717 A | | 8/1994 | Feldman | |
| 5,570,513 A | * | 11/1996 | Peterson | F42B 35/02 33/506 |
| 6,718,645 B2 | * | 4/2004 | Berger | F42B 35/00 33/550 |
| 7,681,481 B1 | | 3/2010 | Buckley | |

(Continued)

FOREIGN PATENT DOCUMENTS

| | | | | |
|---|---|---|---|---|
| GB | 2504963 A | * | 2/2014 | G01B 3/22 |
| WO | WO-2014027194 A1 | * | 2/2014 | G01B 3/22 |

*Primary Examiner* — Yaritza Guadalupe-McCall (57) ABSTRACT

A precision depth measurement device precisely measures pocket depth and seated primer depth for consistent ammunition production. The device includes a drop indicator having a stem. The stem has an outer peripheral surface. A hub is annular having an inner perimeter surface. The inner perimeter surface is complementary in size to the outer peripheral surface of the stem. Thus, the stem of the drop indicator is insertable into the hub. A collar is removably couplable to the hub. The collar has a collar lip extending inwardly from an internal surface of the collar. The collar lip defines a collar opening at a base end of the collar. The collar opening is complementary in size to an ammunition casing wherein the collar receives the ammunition casing and holds the drop indicator in a perpendicular position relative to the ammunition casing.

9 Claims, 6 Drawing Sheets

(56) References Cited

U.S. PATENT DOCUMENTS

| | | | |
|---|---|---|---|
| 8,336,225 B1* | 12/2012 | Zhang | G01B 3/28 |
| | | | 33/542 |
| 9,127,919 B2 | 9/2015 | Holland | |
| 9,200,880 B1 | 12/2015 | Foren | |
| 9,297,628 B2 | 3/2016 | Sluder, III | |
| 9,644,931 B1 | 5/2017 | Cauley, Jr. | |
| 10,265,774 B1 | 4/2019 | Eldredge | |
| 10,794,676 B1 | 10/2020 | Aerni | |
| 10,948,277 B2* | 3/2021 | Gent | G01B 5/241 |
| 2017/0299367 A1* | 10/2017 | Gronback | G01B 5/20 |
| 2018/0120072 A1* | 5/2018 | Sheridan | F42B 35/02 |
| 2020/0309501 A1* | 10/2020 | Gent | F42B 35/02 |
| 2023/0152072 A1* | 5/2023 | Dykstra | F42B 35/02 |
| | | | 86/19.5 |

* cited by examiner

PRECISION DEPTH MEASUREMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to depth measurement devices and more particularly pertains to a new depth measurement device for precisely measuring pocket depth and seated primer depth for consistent ammunition production.

(2) Description of Related Art Including Information Disclosed Under 37 CFR 1.97 and 1.98

The prior art relates to drop indicator devices used to measure pocket depth and seated primer depth when manufacturing ammunition shells. Devices for measuring the depth of a pocket or seated primer depth exist but are generally imprecise and/or specific to a particular ammunition casing size. This results in necessity to have multiple drop indicators and/or measurement error sufficient to result in undesired variation between ammunition shells, particularly those used for high accuracy applications such as competitive shooting.

BRIEF SUMMARY OF THE INVENTION

An embodiment of the disclosure meets the needs presented above by generally comprising a drop indicator having a stem. The stem has an outer peripheral surface. A hub is annular having an inner perimeter surface. The inner perimeter surface is complementary in size to the outer peripheral surface of the stem. Thus, the stem of the drop indicator is insertable into the hub. A collar is removably couplable to the hub. The collar has a collar lip extending inwardly from an internal surface of the collar. The collar lip defines a collar opening at a base end of the collar. The collar opening is complementary in size to an ammunition casing wherein the collar receives the ammunition casing and holds the drop indicator in a perpendicular position relative to the ammunition casing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
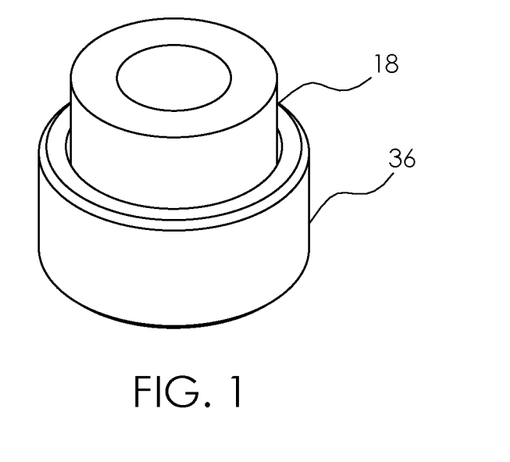
FIG. 1 is a top front side perspective view of a precision depth measurement device according to an embodiment of the disclosure.
Figure 2:
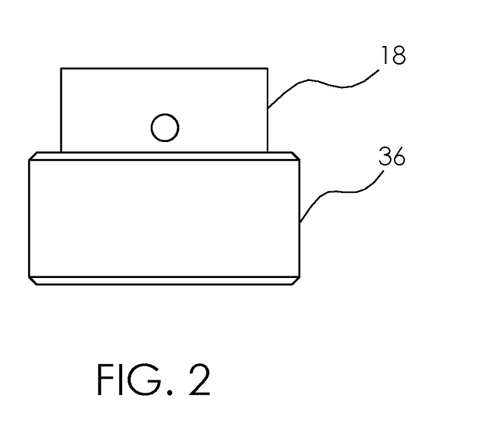
FIG. 2 is a side view of an embodiment of the disclosure.
Figure 3:
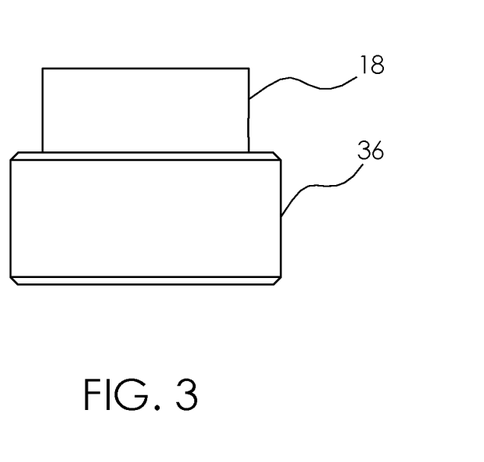
FIG. 3 is a front view of an embodiment of the disclosure.
Figure 4:
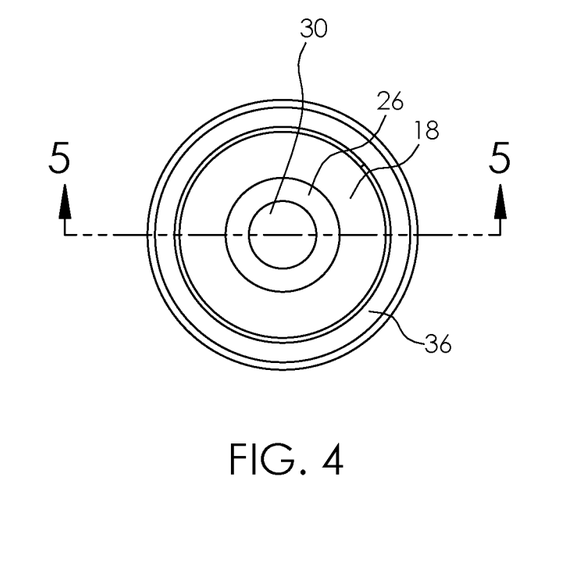
FIG. 4 is a top view of an embodiment of the disclosure.
Figure 5:
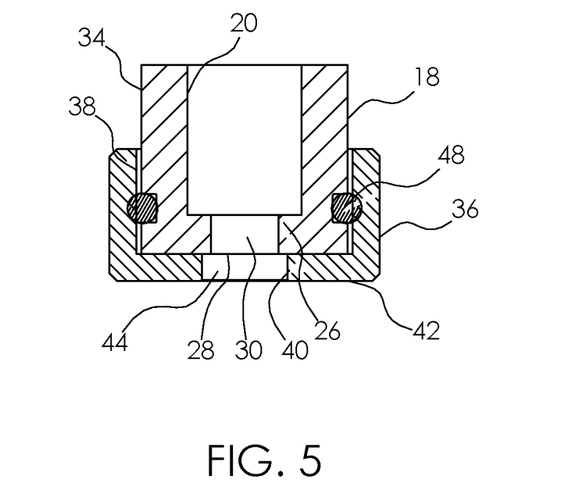
FIG. 5 is a cross-sectional view of an embodiment of the disclosure taken along line 5-5 of FIG. 4.
Figure 6:
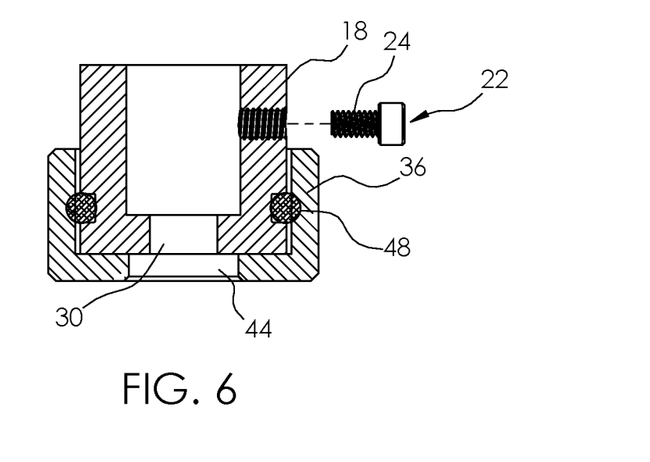
FIG. 6 is a cross-sectional view of an embodiment of the disclosure similar to FIG. 5.
Figure 7:
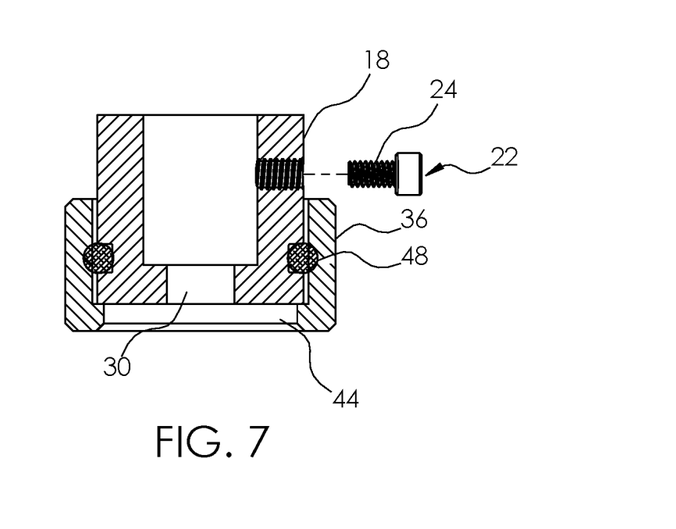
FIG. 7 is a cross-sectional view of an embodiment of the disclosure similar to FIG. 5.
Figure 8:
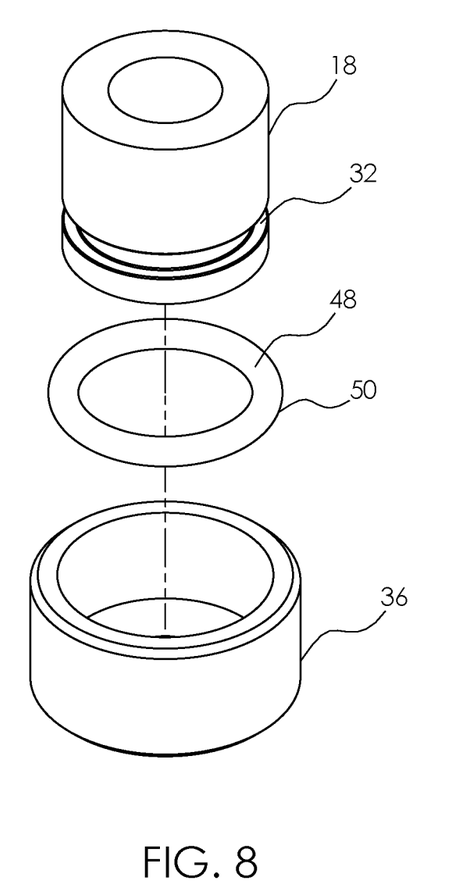
FIG. 8 is an exploded perspective view of an embodiment of the disclosure.
Figure 9:
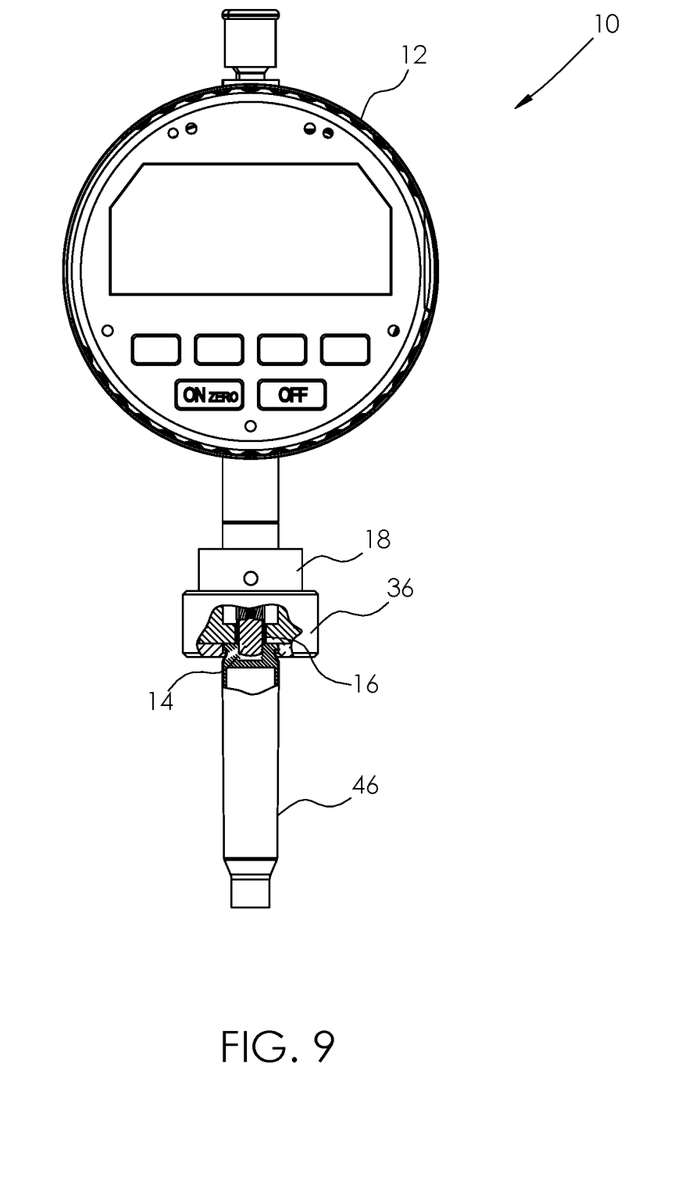
FIG. 9 is a partial cut-away front view of an embodiment of the disclosure.
Figure 10:
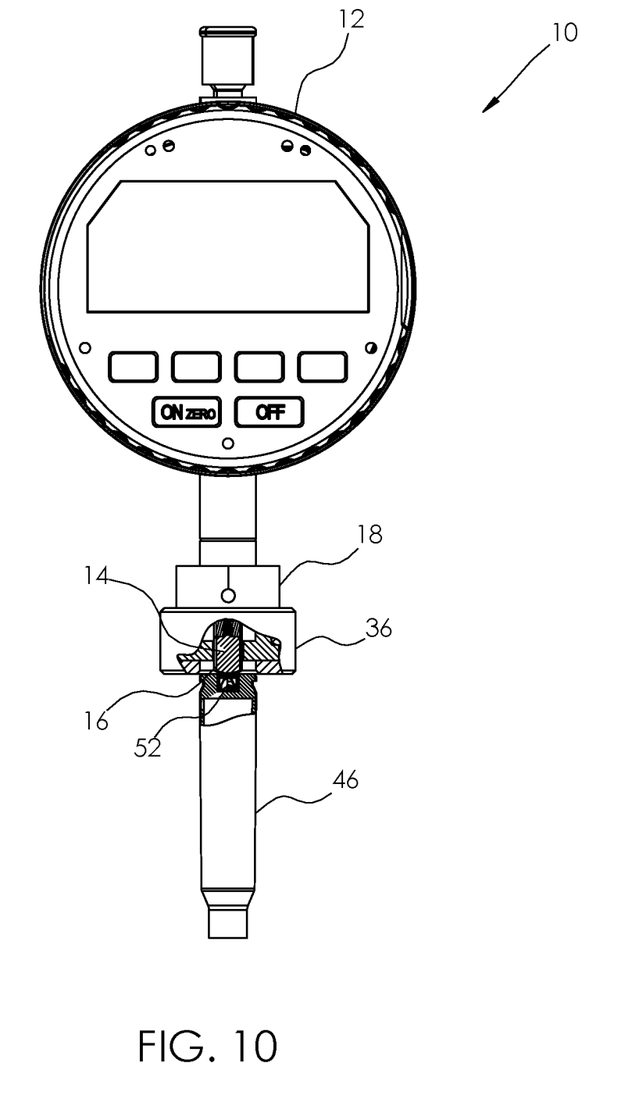
FIG. 10 is a partial cut-away front view of an embodiment of the disclosure.

With reference now to the drawings, and in particular to FIGS. 1 through 10 thereof, a new drop indicator embodying the principles and concepts of an embodiment of the disclosure and generally designated by the reference numeral 10 will be described.

As best illustrated in FIGS. 1 through 10, the precision depth measurement device 10 generally comprises a drop indicator 12 having a stem 14. The drop indicator 12 is of conventional design with the stem 14 having an outer peripheral surface 16. A hub 18 is annular having an inner perimeter surface 20. The inner perimeter surface 20 is complementary in size to the outer peripheral surface 16 of the stem 14 of the drop indicator 12 wherein the stem 14 of the drop indicator 12 is insertable into the hub 18. A fastener 22 is couplable to the hub 18 such that the fastener 22 secures the hub 18 in a static position on the stem 14. The fastener 22 may be a set screw 24. The stem 14 of the drop indicator 12 is centered within the hub 18 when the hub 18 is coupled to the stem 14. A hub lip 26 extends inwardly from the inner perimeter surface 20. The hub lip 26 is positioned at a first end 28 of the hub 18. The hub lip 26 defines a hub opening 30 at the first end 28 of the hub 18. An annular groove 32 extends into an outer perimeter surface 34 of the hub 18.

A collar 36 has an internal surface 38. The collar 36 is removably couplable to the hub 18. The collar 36 has a collar lip 40 extending inwardly from the internal surface 38 of the collar 36. The collar lip 40 is positioned at a base end 42 of the collar 36. The collar lip 40 defines a collar opening 44 at the base end 42 of the collar 36. The collar opening 44 is configured to be complementary in size to an ammunition casing 46 wherein the collar 36 is configured for receiving the ammunition casing 46 and holding the drop indicator 12 in a perpendicular position relative to the ammunition casing 46. The hub opening 30 has a radius less then a radius of the collar opening 44. The hub opening 30 is concentrically aligned with the collar opening 44 when the collar 36 is engaged to the hub 18. A ring 48 is pliable and positioned within the annular groove 32 such that an outer facing portion 50 of the ring 48 extends from the outer perimeter surface 20 of the hub 18. The ring 48 is an O-ring or the like. Thus, the outer facing portion 50 of the ring 48 is positioned to abut an internal surface 54 of the collar 36 whereby the ring 48 frictionally engages the collar 36 to the hub 18.

Ultimately, the collar 36 is one of a plurality of collars 36 with each collar 36 of having a unique sized collar opening 44. Each collar opening 44 of the respective collars 36 corresponds to a conventional size for the respective ammunition casing 46 such as but not limited to 0.380, 0.22, 0.40, 9 mm, 10 mm, 0.45, etc. Thus, each collar 36 is configured to fit a respectively sized ammunition casing 46. Each collar 36 is interchangeably couplable to the hub 18 to allow for consistent positioning of the drop indicator 12 relative to the ammunition casing 46 to provide consistent measurements enhancing uniformity between rounds.

In use, measurements are taken when loading or reloading ammunition casings 46. Each ammunition casing 46 can be measured for pocket depth and again after placement of a primer 52 for primer depth. Consistent positioning of the drop indicator 12 relative to each ammunition casing 46 facilitates having greater uniformity between completed ammunition rounds. This provides greater reliability and uniformity in performance which is particularly advantageous in competition shooting.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A precision depth measurement device comprising:
a drop indicator having a stem, said stem having an outer peripheral surface;
a hub, said hub being annular, said hub having an inner perimeter surface, said inner perimeter surface being complementary to said outer peripheral surface of said stem of said drop indicator wherein said stem of said drop indicator is insertable into said hub; and
a collar, said collar having an internal surface, said collar being removably couplable to said hub, said collar having a collar lip extending inwardly from an internal surface of said collar, said collar lip being positioned at a base end of said collar, said collar lip defining a collar opening at said base end of said collar, said collar opening being configured to be complementary to an ammunition casing wherein said collar is configured for receiving the ammunition casing and holding said drop indicator in a perpendicular position relative to the ammunition casing, said collar being one of a plurality of collars, each collar of said plurality of collars having a unique sized collar opening wherein each collar of said plurality of collars is configured to fit a respectively sized ammunition casing, said plurality of collars being interchangeably couplable to said hub.

2. The precision depth measurement device of claim 1, further comprising a fastener, said fastener being couplable to said hub such that said fastener secures said hub in a static position on said stem.

3. The precision depth measurement device of claim 2, further comprising said fastener being a set screw.

4. The precision depth measurement device of claim 1, further comprising said hub having a hub lip extending inwardly from said inner perimeter surface, said hub lip being positioned at a first end of said hub, said hub lip defining a hub opening at said first end of said hub.

5. The precision depth measurement device of claim 4, further comprising said hub opening having a radius less then a radius of said collar opening.

6. The precision depth measurement device of claim 5, further comprising said hub opening being concentrically aligned with said collar opening when said collar is engaged to said hub.

7. The precision depth measurement device of claim 1, further comprising said stem of said drop indicator being centered within said hub when said hub is coupled to said stem.

8. A precision depth measurement device comprising:
a drop indicator having a stem, said stem having an outer peripheral surface;
a hub, said hub being annular, said hub having an inner perimeter surface, said inner perimeter surface being complementary to said outer peripheral surface of said stem of said drop indicator wherein said stem of said drop indicator is insertable into said hub;
a collar, said collar having an internal surface, said collar being removably couplable to said hub, said collar having a collar lip extending inwardly from an internal surface of said collar, said collar lip being positioned at a base end of said collar, said collar lip defining a collar opening at said base end of said collar, said collar opening being configured to be complementary to an ammunition casing wherein said collar is configured for receiving the ammunition casing and holding said drop indicator in a perpendicular position relative to the ammunition casing;
an annular groove extending into an outer perimeter surface of said hub; and a ring, said ring being pliable, said ring being positioned within said annular groove such that an outer facing portion of said ring extends from said outer perimeter surface of said hub wherein said outer facing portion of said ring is positioned to abut an internal surface of said collar whereby said ring frictionally engages said collar to said hub.

9. A precision depth measurement device comprising:

a drop indicator having a stem, said stem having an outer peripheral surface;

a hub, said hub being annular, said hub having an inner perimeter surface, said inner perimeter surface being complementary to said outer peripheral surface of said stem of said drop indicator wherein said stem of said drop indicator is insertable into said hub, said stem of said drop indicator being centered within said hub when said hub is coupled to said stem a hub lip extending inwardly from said inner perimeter surface, said hub lip being positioned at a first end of said hub, said hub lip defining a hub opening at said first end of said hub;

a fastener, said fastener being couplable to said hub such that said fastener secures said hub in a static position on said stem, said fastener being a set screw;

an annular groove extending into an outer perimeter surface of said hub;

a collar, said collar having an internal surface, said collar being removably couplable to said hub, said collar having a collar lip extending inwardly from an internal surface of said collar, said collar lip being positioned at a base end of said collar, said collar lip defining a collar opening at said base end of said collar, said collar opening being configured to be complementary to an ammunition casing wherein said collar is configured for receiving the ammunition casing and holding said drop indicator in a perpendicular position relative to the ammunition casing, said hub opening having a radius less then a radius of said collar opening, said hub opening being concentrically aligned with said collar opening when said collar is engaged to said hub;

a ring, said ring being pliable, said ring being positioned within said annular groove such that an outer facing portion of said ring extends from said outer perimeter surface of said hub wherein said outer facing portion of said ring is positioned to abut an internal surface of said collar whereby said ring frictionally engages said collar to said hub; and wherein said collar is one of a plurality of collars, each collar of said plurality of collars having a unique sized collar opening wherein each collar of said plurality of collars is configured to fit a respectively sized ammunition casing, said plurality of collars being interchangeably couplable to said hub.

\* \* \* \* \*